(12) United States Patent
Huff et al.

(10) Patent No.: US 10,152,668 B2
(45) Date of Patent: Dec. 11, 2018

(54) IDENTIFICATION BADGE SYSTEM

(71) Applicants: Ronald James Huff, Houston, TX (US); Pedro Luis Pena, Miami, FL (US)

(72) Inventors: Ronald James Huff, Houston, TX (US); Pedro Luis Pena, Miami, FL (US)

(73) Assignee: SafePass, Inc., Frisco, TX (US)

( * ) Notice: Subject to any disclaimer, the term of this patent is extended or adjusted under 35 U.S.C. 154(b) by 0 days.

(21) Appl. No.: 15/871,889

(22) Filed: Jan. 15, 2018

(65) Prior Publication Data

US 2018/0260672 A1 Sep. 13, 2018

Related U.S. Application Data

(63) Continuation-in-part of application No. 15/437,291, filed on Feb. 20, 2017, now abandoned.

(51) Int. Cl.

| | |
|---|---|
| *G06K 19/07* | (2006.01) |
| *G06F 3/147* | (2006.01) |
| *G08B 5/36* | (2006.01) |
| *G06K 19/06* | (2006.01) |
| *G06K 7/10* | (2006.01) |
| *H02J 7/00* | (2006.01) |

(Continued)

(52) U.S. Cl.
CPC ......... *G06K 19/0723* (2013.01); *G06F 3/147* (2013.01); *G06K 7/10297* (2013.01); *G06K 19/06028* (2013.01); *G08B 5/36* (2013.01); *H02J 7/0027* (2013.01); *H02J 7/0044* (2013.01); *G06K 2019/06281* (2013.01); *G07C 9/00015* (2013.01); *G07C 9/00103* (2013.01); *G07C 2209/41* (2013.01); *G09G 3/344* (2013.01)

(58) Field of Classification Search
CPC ..... G06K 19/0723; G06K 2019/06281; G06K 19/06028; G06K 7/10297; H02J 7/0027; H02J 7/0044; G06F 3/147; G08B 5/36; G09G 3/344; G07C 9/00103; G07C 9/00015; G07C 2209/41
USPC ...................................................... 340/10.1
See application file for complete search history.

(56) References Cited

U.S. PATENT DOCUMENTS 9,984,320 B2 * 5/2018 Bae .................. G06K 19/07
10,028,120 B2 * 7/2018 Eisenman .......... G08B 13/1672
(Continued)

*Primary Examiner* — Hirdepal Singh
(74) *Attorney, Agent, or Firm* — Karen B. Tripp

(57) ABSTRACT

An identification badge system having an image relaying device for communicating an electronic image, a base station for communicating with the image relaying device, a readiness indicator, and a reusable badge. The badge has a housing, a colored e-paper display, a radio frequency identification tag, and a Wi-Fi transponder and related circuitry that sends radio frequency signals to Wi-Fi routers or Bluetooth beacons in the facility using the system for real-time location tracking of the badge using GPS. Backscatter can be used to encode information on the Wi-Fi signals with little or no battery energy. Tracking information can be stored apart from the badge. The base station has at least one docking receptacle for docking the badge for charging only or also for communication of the electronic image to the badge e-paper display and for erasing the image from the display.

18 Claims, 4 Drawing Sheets

(51) Int. Cl.
*G09G 3/34* (2006.01)
*G07C 9/00* (2006.01)

(56) References Cited

U.S. PATENT DOCUMENTS

| | | | |
|---|---|---|---|
| 2014/0240299 A1* | 8/2014 | Gila | G06F 3/03545 345/179 |
| 2014/0266590 A1* | 9/2014 | Guillaud | G07C 9/00111 340/5.65 |
| 2016/0093246 A1* | 3/2016 | Park | G09G 3/2096 345/211 |
| 2016/0335580 A1* | 11/2016 | Jones | G06Q 10/06398 |
| 2016/0358198 A1* | 12/2016 | Bakhoum | G06Q 30/0226 |
| 2017/0315767 A1* | 11/2017 | Rao | G06F 3/147 |

* cited by examiner

IDENTIFICATION BADGE SYSTEM

RELATED APPLICATION

This patent application is a continuation-in-part from U.S. patent application Ser. No. 15/437,291, filed Feb. 20, 2017, pending.

FIELD OF THE INVENTION

The present invention relates to a system for identification badges and, in particular, to a system for issuing and maintaining identification badges, especially visitor identification badges.

BACKGROUND OF THE INVENTION

Many employers require that employees wear badges for identifying authorized personnel in an employer's facility. Many of those employers, therefore, also require visitors to wear badges to confirm that the visitor has checked-in at a designated checkpoint. Beyond safeguarding against misuse of an employer's intellectual property, such check-in is often required so that, in the event of an emergency, all persons may be accounted for.

U.S. Pat. No. 7,733,231B2 (Carney et al) describes a security device with a printed portion and a display portion. The printed portion includes a printed photograph and printed information relating to the person's identification, occupation, security level, etc. The display portion may be an e-paper surface or other type of display, that displays information, by text or image, based on data from another security device. For example, the display portion may display the default information "Inactive," alongside the printed portion of the device. Carney et al describe a variety of embodiments of the security badge, many that are very complex in scope, but most relate to use by a person on a more permanent basis than for a visitor's badge.

That is, such a security badge as described in Carney et al may be well-suited to a more permanent use by an employee. However, it is very complex for a visitor badge.

Some companies print visitor identification information on a label having an adhesive backing. Adhesive backings however often fail on some fabrics (for example, heavy woven wool), while being too aggressive on other fabrics (for example, lightweight silk). Alternatively, the label may be designed to be carried in a plastic sleeve that can be pinned or clipped to a visitor's article of clothing or hung from a visitor's neck with a lanyard, for example. Still other companies provide a generic "visitor" badge that demonstrates that the visitor has passed through an identification check-point and is authorized to be on site. However, many badges do not provide a display that can be readily authenticated by security personnel or other employees walking past a visitor in a hallway, for example. Without an image of the person for whom the badge was intended, visitor badges may be inadvertently or fraudulently provided to unauthorized persons. Furthermore, label printers are notorious for breaking down or running out of ink at the most inopportune times, for example, when a large number of visitors arrive at the same time or a very important visitor is awaiting check-in.

There is a need for an identification badge system that is more easily implemented. There is also a need for an identification badge system that is reusable.

BRIEF DESCRIPTION OF THE DRAWINGS

The system of the present invention will be better understood by referring to the following detailed description of preferred embodiments and the drawings referenced therein, in which.

SUMMARY OF THE INVENTION

According to one aspect of the present invention, there is provided an identification badge system, comprising: an image relaying device for communicating an electronic image of a person; a base station for communicating with the image relaying device, the base station having at least one docking receptacle; a readiness indicator; and a reusable badge having a housing, and an e-paper display; the housing adapted to be docked in the at least one docking receptacle of the base station, for charging of the badge only or for also communicating the electronic image from the base station to the e-paper display when the housing is docked in the at least one docking receptacle of the base station; and the e-paper display adapted to maintain the electronic image received from the image relaying device when the reusable badge is removed from the at least one docking receptacle of the base station; the readiness indicator adapted to indicate when the base station has completed communication of the electronic image to the reusable badge, whereby the reusable badge is ready for use and removal from the base station; and wherein the base station is adapted to erase the electronic image from the e-paper display when the reusable badge is re-docked into the at least one docking receptacle of the base station. In one embodiment, the e-paper display is colored, either by a colored film overlying the display or with colored e-ink.

In one embodiment, the reusable badge includes a Radio Frequency Identification tag (RFID tag), which can communicate for example with standard access control readers, writers, and controllers at secure facilities.

The reusable badge also includes a Wi-Fi transponder and associated circuitry that is used for tracking visitor location by sending a radio frequency signal to Wi-Fi routers or Bluetooth beacons in a facility. This tracking includes real-time location tracking and in one embodiment provides for historical location tracking information to be stored in a secure location apart from the digital visitor badge.

DETAILED DESCRIPTION OF THE INVENTION

The present invention provides a temporary/visitor identification badge system that is readily implemented at an identification checkpoint, for example, in the lobby of an employer's facility or other restricted access facility. The identification badge system of the present invention is also adaptable to receiving images of pre-authorized visitors or guests to a large function, conference, or the like. The identification badge system of the present invention is particularly advantageous for use with visitors to restricted access facilities, where visitor identification and control must be assured and even monitored.

Figure 1:
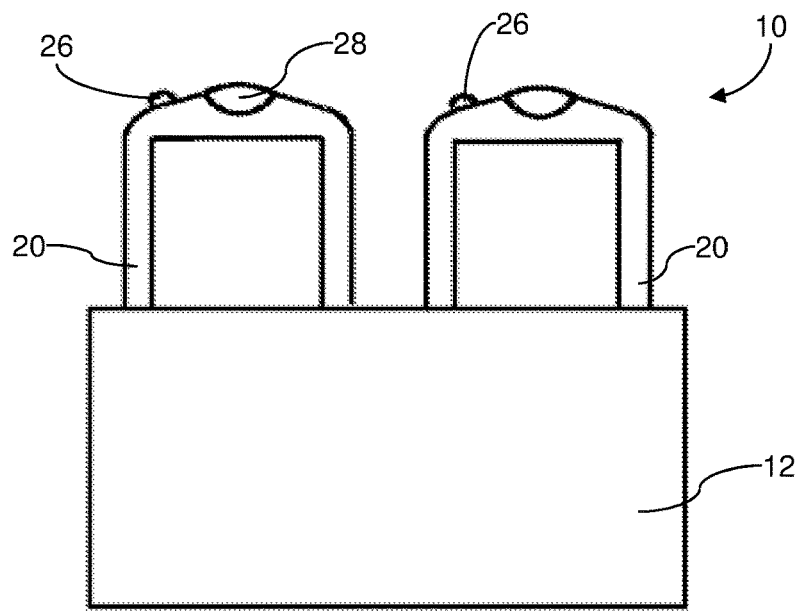
FIG. 1 is a front elevation view of one embodiment of an identification badge system of the present invention.
Figure 2:
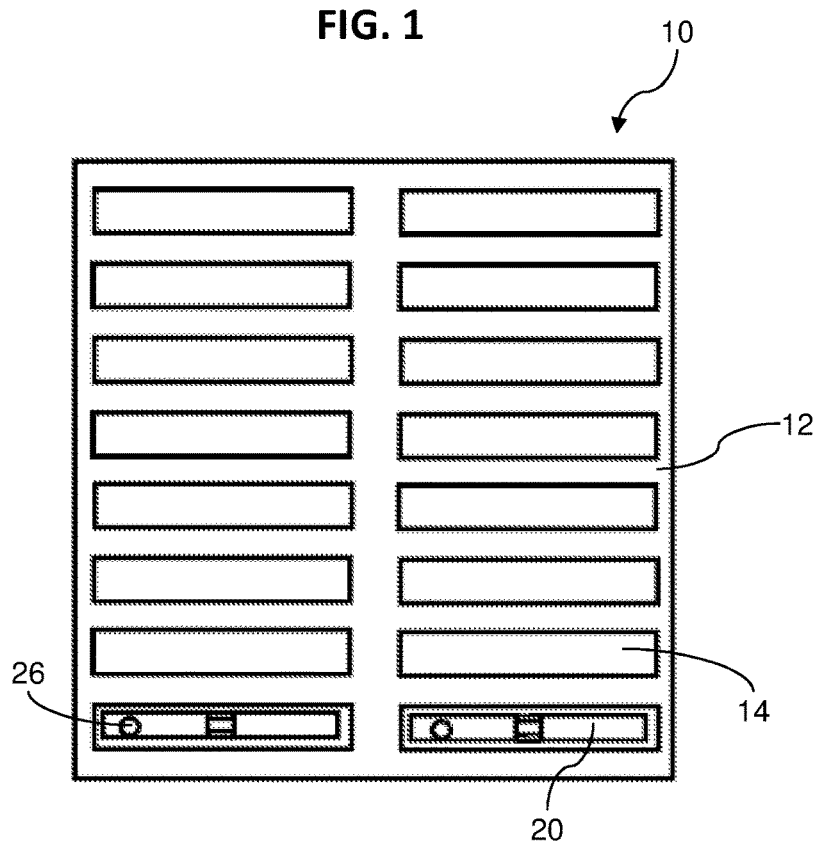
FIG. 2 is a top plan view of the identification badge system of FIG. 1.

Referring now to the drawings, FIGS. 1 and 2 illustrate one embodiment of an identification badge system 10 of the present invention. The identification badge system 10 of the present invention has a base station 12. The base station 12 has at least one docking receptacle 14 for docking a reusable badge 20. In the embodiment shown in FIGS. 1 and 2, the base station 12 has 16 docking receptacles 14 for receiving up to 16 reusable badges 20 at one time. Other numbers and configurations of docking receptacles 14 are possible without departing from the spirit of the present invention.

The base station 12 can be connected to a computer (not shown) for providing a user interface with the base station 12. Connection to a computer may be particularly advantageous at a permanent security or reception desk or office of a controlled access building for example. Alternatively, the base station 12 may be adapted to receive any required information for operating on a standalone basis. Such an operation may be particularly applicable at a check-in table at a conference or other large function where a check-in table is set up on a temporary basis. The base station 12 may house a single board computer (not shown) that provides a user interface via a web browser.

In either case, the base station 12 can be used to charge the badges and is adapted to communicate with an image relaying device (not shown), directly, or indirectly through a computer. The image relaying device may be an image capture device, such as a camera or a scanner capable of scanning a photo ID of a visitor or guest. In this case, the operator of the identification badge system 10 of the present invention would authenticate the identification of the visitor or guest by comparing the photo ID to the face of the visitor or guest.

Alternatively, the image, along with any other identification, of a visitor or guest may be provided electronically in advance of the visitor or guest arrival. The data for the visitor or guest may be relayed to a computer that is connected to the base station. Or the data may be provided to the base station 12 with a portable drive, such as an external hard drive, a thumb drive, or the like. In one embodiment, the visitor or guest in such case may be provided with a barcode or QR code receipt, for example, for presenting to an operator of the identification badge system 10 of the present invention who can scan it with a barcode reader or QR code reader to produce an image on the reusable badge 20.

This is particularly advantageous when a large group of visitors or guests are expected to arrive concurrently, for example, in time for a meeting, or for VIP guests who do not have time to wait for a long authentication and printing process. This is also advantageous, for example, at a conference or other event, where visitors or guests are required to pre-register and/or pre-pay for access to the conference. The visitor or guest may be provided with a barcode or QR code receipt, after pre-registering and uploading an electronic image of themselves. Then when they arrive at the check-in desk, they provide the receipt to a greeter, who scans the information with a barcode reader or QR code reader to bring up the electronic image for relaying to the base station 12, and authenticates the identification of the visitor or guest by comparing the photo ID to the face of the visitor or guest.

Figure 3:
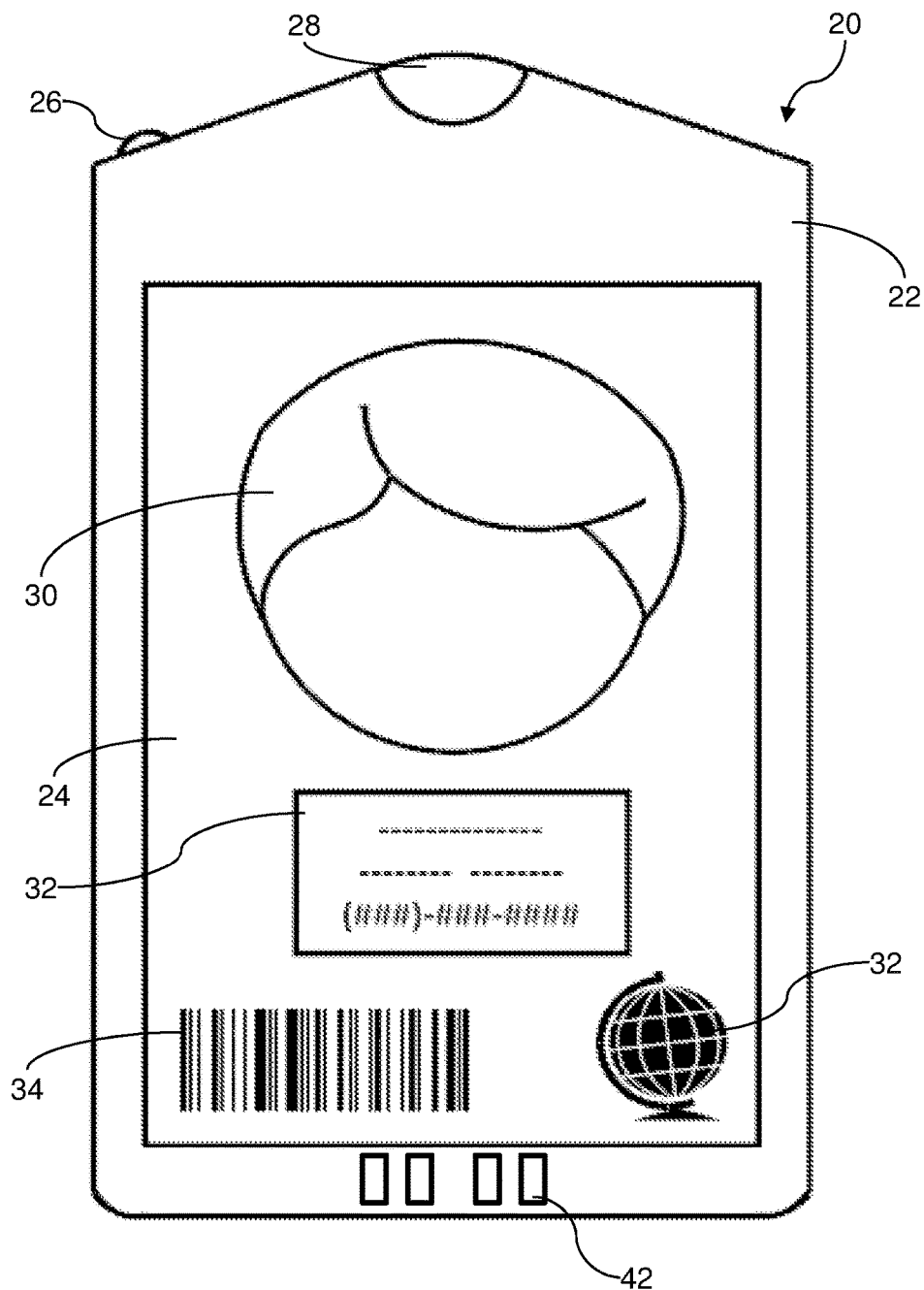
FIG. 3 is a front elevation view of one embodiment of a reusable badge of the identification badge system of the present invention.

One embodiment of the reusable badge 20 of the present invention is illustrated more clearly in FIG. 3. The reusable badge 20 has a housing 22, an e-paper display 24, and a readiness indicator. The readiness indicator is depicted in FIGS. 1-3 as an indicator light 26. However, it will be understood by those skilled in the art that the readiness indicator may be a lit-up backlight on the e-paper display or an audible signal (not shown), without departing from the spirit of the invention.

The housing 22 is preferably made of plastic to protect the e-paper display 24, while being lightweight enough so as not to overly burden the visitor or guest. The housing 22 is provided with suitable contacts on its base, sides or back for communicating with the base station 12 when the reusable badge 20 is docked in the docking receptacle 14. In the embodiment shown in FIG. 3, contacts 42 are provided on the front face of the housing 22 for contacting corresponding base station contacts (not shown). It will be understood by those skilled in the art that other numbers or configurations of contacts 42 may be possible without departing from the spirit of the present invention.

The housing 22 is preferably provided with a loop 28 to enable a visitor or guest to carry the reusable badge 20 with a lanyard, strap, clip or the like.

The e-paper display 24 can be provided with e-ink, which typically is an electrophoretic display composed of a large number of light and dark nanoparticles suspended between two plates of electrostatically-charged glass. E-paper mimics the appearance of ink in an electronic display. The display may be black and white or colored, depending on the requirements and/or wishes of the employer and/or event. Suitable electronic displays can be provided by a variety of technologies, including, without limitation, electrophoretic, electrowetting, electrofluidic, interferometric modulator, and plasmonic techniques. In one embodiment, color transparent film (not shown) can be placed over the display portion of the reusable badge 20, and particularly over at least a portion of the e-paper display 24 such as for non-limiting example the photograph for differentiation of visitors, vendors and other temporary personnel.

An image 30 of the visitor or guest is transmitted from the image relaying device to the base station 12 and is communicated to the reusable badge 20 when the reusable badge 20 is docked in the base station 12.

Preferably, additional information 32 is provided including, without limitation, the visitor or guest name, company name, name of person being visited, phone number of person being visited, expected duration of stay, company logo of visitor or guest, logo of event or company being visited, reason for visit, and the like.

In another embodiment, an identifying symbol, such as a bar code 34 or QR code is relayed through the base station 12 to the e-paper display 24. The identifying symbol may include further detail on the visitor or guest, authorization to access special events, such as pre-paid lunches within a larger event, or to access tight security or hazardous areas, important medical or allergy information, ICE numbers, and the like.

The indicator light 26 signals that the base station 12 has completed communication of the electronic image 20 and any additional information 32 and/or identifying symbol 34 to the e-paper display 24. The indicator light 26 signals that the reusable badge 20 may be removed from the base station 12. The e-paper display 24 maintains the electronic image 30 after the reusable badge 20 is removed from the base station 12, without the need for a power supply in the reusable badge 20. In one embodiment, indicator light 26, or another or additional indicator light (not shown) can show battery level or power level of the badge and/or can be used for emergency notification, such as for non-limiting example to flash in an emergency.

Figure 4:
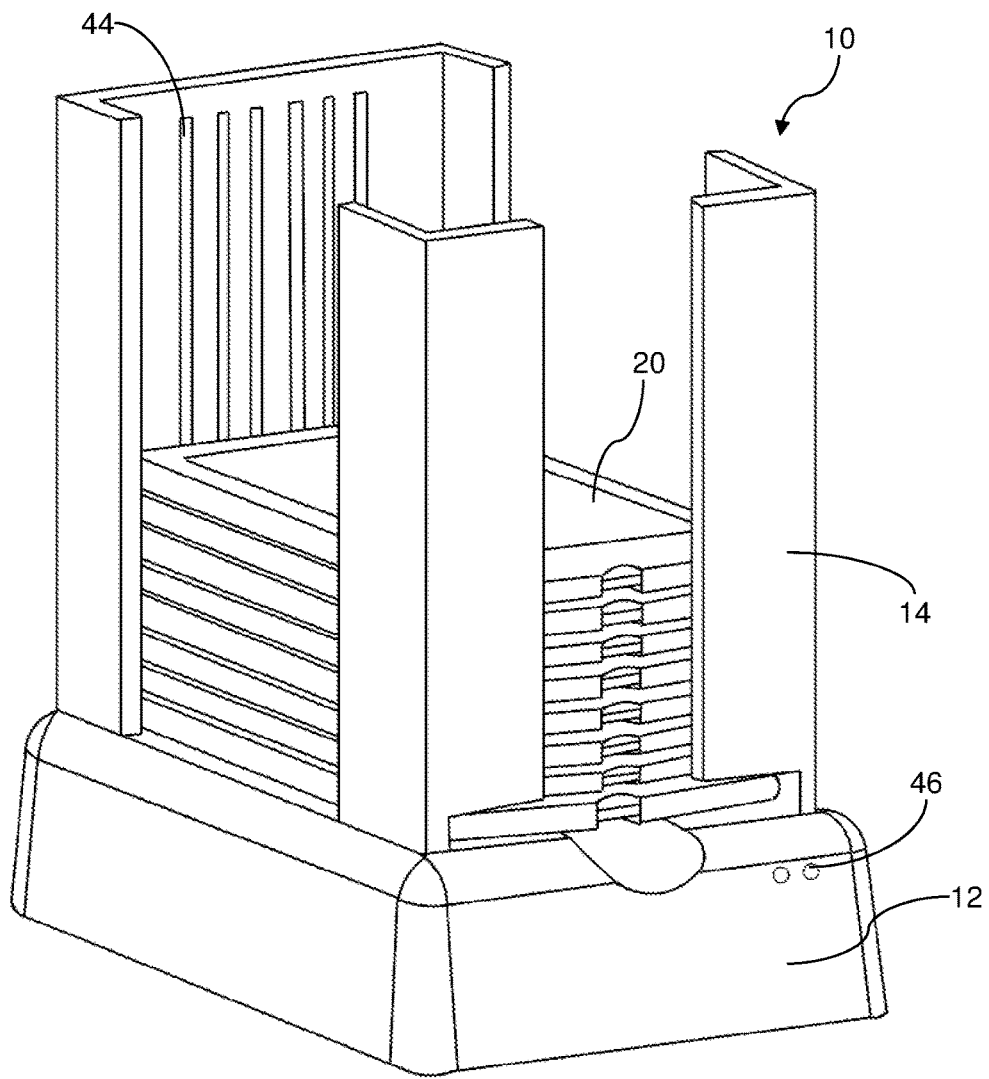
FIG. 4 is a perspective view of another embodiment of an identification badge system of the present invention.
Figure 5:
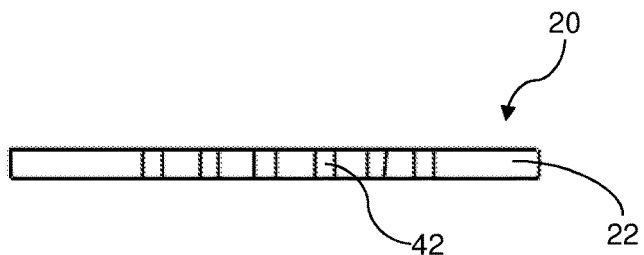
FIG. 5 is a bottom plan view of another embodiment of a reusable badge of the identification badge system of the present invention.

Another embodiment of the identification badge system 10 of the present invention is shown in FIGS. 4 and 5. In this embodiment, reusable badges 20 are stacked in a single docking receptacle 14. Contacts 42 are provided on the base of the reusable badge 20 and are configured to engage corresponding contacts 44 on an inner back face of the docking receptacle 14.

Also in the embodiment shown in FIGS. 4 and 5, the readiness indicator is an indicator light 46 on the base station 12. The indicator light 46 signals that the reusable badge 20 may be removed from the base station 12. The e-paper display 24 maintains the electronic image 30 after the reusable badge 20 is removed from the base station 12, without the need for a power supply in the reusable badge 20.

In a further embodiment, the reusable badge 20 has a radio frequency identification tag ("an RFID tag") (not shown) housed in the housing 22. Preferably, the RFID tag is a HF RFID tag or a UHF RFID tag.

The RFID tag is adapted to communicate with an RFID reader, for example, equipped within the base station 12. Alternatively, the RFID reader may be a separate piece of equipment. Preferably, the base station 12 is equipped with an RFID reader (not shown). The RFID tag inside the reusable badge 20 can also communicate with standard access control readers, writers, and controllers at secure facilities. Such communication, for example, can allow access to certain parts or places in such facilities.

In one embodiment, the RFID tag can be used to provide tracking information, including, without limitation, a time stamp for removing the reusable badge from the base station, a time stamp for re-docking the reusable badge at the base station, electronic image 30 information, electronic identity information associated with the electronic image 30, accountable person information, authentication information, and combinations thereof.

More particularly, RFID (Radio-frequency identification) uses electromagnetic fields to automatically identify and track RFID tags attached to objects. The electromagnetic fields can be generated by access readers that are usually located near an entryway, for example. The generated field activates the RFID tag and causes it to transmit the data stored within it. The data is then read by the access readers and later stored. This data contains a unique ID number that is used to identify each tag. In one embodiment, the tracking element of this process is simply logging the date and time of each unique tag when activated and read by a reader fixed at a known location.

In one embodiment, the reusable badge 20 has a Wi-Fi transponder and circuitry for real-time location tracking (RTLS). The reusable badge 20 sends a radio frequency signal to Wi-Fi routers or Bluetooth beacons in a facility. This tracking includes real-time location tracking using GPS (Global Positioning System) and in one embodiment can provide for historical location tracking information to be stored in a secure location apart from the digital visitor badge.

That is, in one embodiment, the Wi-Fi location tracking system leverages existing Wi-Fi sources, e.g., routers and access points, to track the location of a visitor badge. The transponder and associated circuitry inside the badge of the invention use standard Wi-Fi frequencies to detect these sources for which the locations are known. Data such as signal strength, atmospheric pressure and SSID (name associated with a wireless local area network) are gathered and transmitted via the same Wi-Fi infrastructure to software waiting to receive them. Using several techniques, the position of a badge relative to the Wi-Fi sources can be calculated in 3D space with varying degrees of accuracy.

In one embodiment, the Wi-Fi tracking system will use Wi-Fi backscattering technology. That is, the Wi-Fi tracking system will take advantage of backscatter to encode information on Wi-Fi signals with little or no energy from a battery. Current routers and access points are designed to filter out backscatter as it is considered noise and not used for communications. Custom firmware on routers and access points will use a digital envelope detector and low pass filter to extract the encoded information from the received backscatter. The badge's ID will be invisibly encoded in the actual housing and read using backscatter.

In another embodiment, the reusable badge 20 is provided with a power supply, for example a battery (not shown) or a capacitor (not shown).

For example, a capacitor may be provided to hold a charge sufficient to erase the electronic image 30 from the e-paper display 24 if the reusable badge 20 is not re-docked within a prescribed period of time. Alternatively, the capacitor may provide a charge sufficient to overwrite the electronic image from the e-paper display if the reusable badge is not re-docked within a prescribed period of time, for non-limiting example, with a message indicating that the reusable badge 20 has expired, with a pictorial image, a text image, a notice to call a security phone number, a prescribed expiration color, cross-hatching and combinations thereof.

Figure 6A:
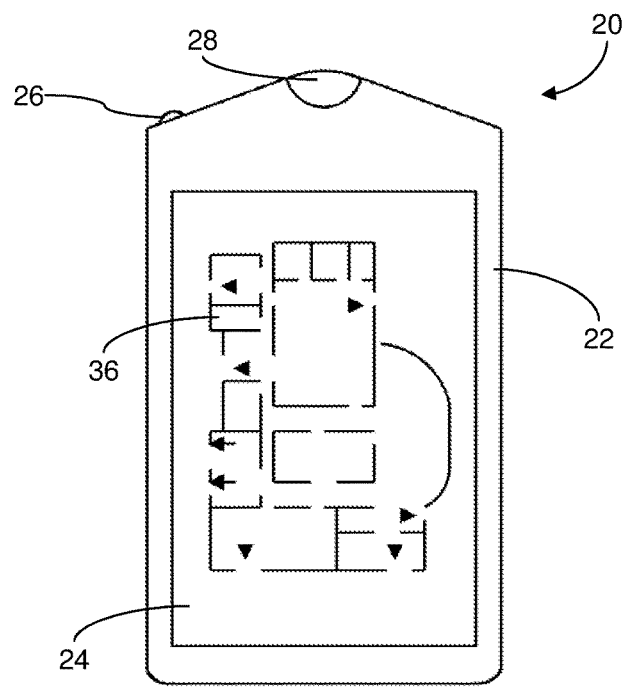
FIG. 6A is a front elevation view of yet another embodiment of a reusable badge of the identification badge system of the present invention.
Figure 6B:
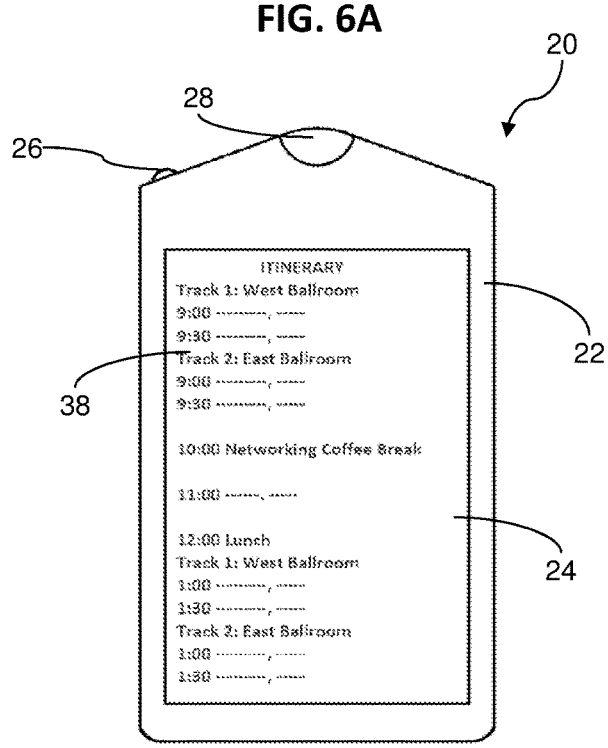
FIG. 6B is a front elevation view of a further embodiment of a reusable badge of the identification badge system of the present invention.

In yet another embodiment, a battery, which may be a reusable battery, is provided, for non-limiting example, to allow a visitor or guest to access informational or safety information, for example, on a second page of the reusable badge 20, as explained for the embodiments of FIGS. 6A and 6B.

FIGS. 6A and 6B illustrate further embodiments of the reusable badge 20 of the identification badge system 10 of the present invention. Often when visitors or guests are checked-in at a restricted access facility, they are provided with an additional pamphlet with safety information, including, for example, a fire escape map. The e-paper display 24 of the present invention can be configured to allow for a finger-swipe, for example, to at least one additional display page of the e-paper display 24 showing safety information, for example, a fire escape plan 36, as depicted in FIG. 6A. Other types of safety information may include emergency numbers, laboratory safety precautions, information about site-specific dangers, and the like. In one embodiment, the reusable badge 20 has an internal buzzer for emergency notification. Preferably, the e-paper display 24 defaults back to the electronic image 30 within a prescribed period of time.

Alternatively, or in addition to the safety information, the e-paper display 24 of the present invention can be configured to include at least one additional page for a conference or meeting itinerary 38, as illustrated in FIG. 6B.

While preferred embodiments of the present disclosure have been described, it should be understood that various changes, adaptations and modifications can be made therein without departing from the spirit of the invention(s) as claimed below.

What is claimed is:

1. A temporary/visitor identification badge system, comprising:
   an image relaying device for communicating an electronic image of a person;
   a base station for charging the badges and communicating with the image relaying device, the base station having at least one docking receptacle;
   a readiness indicator; and
   a reusable badge having:
      a housing, a buzzer or vibration device, a colored e-paper display or colored film placed over a black and white e-paper display, a Wi-Fi transponder or GPS chip and associated circuitry for Wi-Fi Real-Time Location Tracking (RTLS) or Global Positioning System (GPS) location tracking, and a Wi-Fi or Bluetooth transponder for communication and data transfer with the badge;
   the housing adapted to be docked in the at least one docking receptacle of the base station, for charging the badges and for communicating the electronic image from the base station to the e-paper display when the housing is docked in the at least one docking receptacle of the base station; and
   the e-paper display adapted to maintain the electronic image received from the image relaying device when the reusable badge is removed from the at least one docking receptacle of the base station;
   the readiness indicator adapted to indicate when the base station has completed communication of the electronic image to the reusable badge, whereby the reusable badge is ready for use and removal from the base station;
   wherein the base station is adapted to erase the electronic image from the e-paper display when the reusable badge is re-docked into the at least one docking receptacle of the base station;
   wherein the reusable badge further comprises an RFID tag, and a power supply.

2. The identification badge system according to claim 1 wherein the reusable badge is encoded with identification or information readable using Wi-Fi backscattering.

3. The identification badge system according to claim 1 further comprising a storage location apart from the badge or the base station for receiving and storing badge location tracking information.

4. The identification badge system of claim 1 wherein the e-paper display is colored with an overlying film having at least one color.

5. The identification badge system of claim 1 wherein the e-paper display is colored with e-ink.

6. The identification badge system of claim 1 wherein the system is used at a facility having RFID readers at access points in the facility and the RFID tag in the reusable badge is used to communicate with said RFID readers.

7. The identification badge system according to claim 1, wherein the base station further comprises an RFID reader for communicating with the RFID tag, whereby information is communicated to the base station, the information being selected from the group consisting of a time stamp for removing the reusable badge from the base station, a time stamp for re-docking the reusable badge at the base station, electronic image information, electronic identity information associated with the electronic image, accountable person information, authentication information, and combinations thereof.

8. The identification badge system according to claim 1, wherein the RFID tag is selected from the group consisting of HF RFID tags, UHF RFID tags, and combinations thereof.

9. The identification badge system according to claim 1, wherein the power supply is a capacitor for holding a charge sufficient to erase the electronic image from the e-paper display if the reusable badge is not re-docked within a prescribed period of time.

10. The identification badge system according to claim 1, wherein the power supply is a capacitor for holding a charge sufficient to overwrite the electronic image from the e-paper display if the reusable badge is not re-docked within a prescribed period of time.

11. The identification badge system according to claim 1, wherein the power supply is a battery.

12. The identification badge system according to claim 1, wherein the base station is further adapted to communicate additional identification information to the reusable badge and the e-paper display further comprises at least one additional page of information.

13. The identification badge system according to claim 1, wherein the image relaying device is selected from the group consisting of a scanner, a camera, a QR reader, a bar code reader, and combinations thereof.

14. The identification badge system according to claim 1, wherein the base station is adapted to dock a plurality of reusable badges.

15. The identification badge system according to claim 1, wherein the base station is adapted to connect to a computer.

16. The identification badge system according to claim 1, wherein the readiness indicator is provided on the reusable badge.

17. The identification badge system according to claim 1, wherein the readiness indicator is provided on the base station.

18. The identification badge system according to claim 1, wherein the buzzer or vibration device is provided on the base station.

* * * * *